Sept. 4, 1962 F. R. FLUHR 3,052,850

SWITCHING CIRCUIT HAVING TRANSIENT SIGNAL MINIMIZING MEANS

Original Filed July 2, 1957

INVENTOR
FREDERICK R. FLUHR

BY Robert C. Lucke AGENT

Richard C. Reed ATTORNEY

United States Patent Office 3,052,850
Patented Sept. 4, 1962

3,052,850

SWITCHING CIRCUIT HAVING TRANSIENT SIGNAL MINIMIZING MEANS

Frederick R. Fluhr, Fort Foote, Md., assignor to the United States of America as represented by the Secretary of the Navy Original application July 2, 1957, Ser. No. 669,687, now Patent No. 2,959,690, dated Nov. 8, 1960. Divided and this application Mar. 31, 1960, Ser. No. 19,123
3 Claims. (Cl. 328—101)
(Granted under Title 35, U.S. Code (1952), sec. 266)

Figures 1, 2:
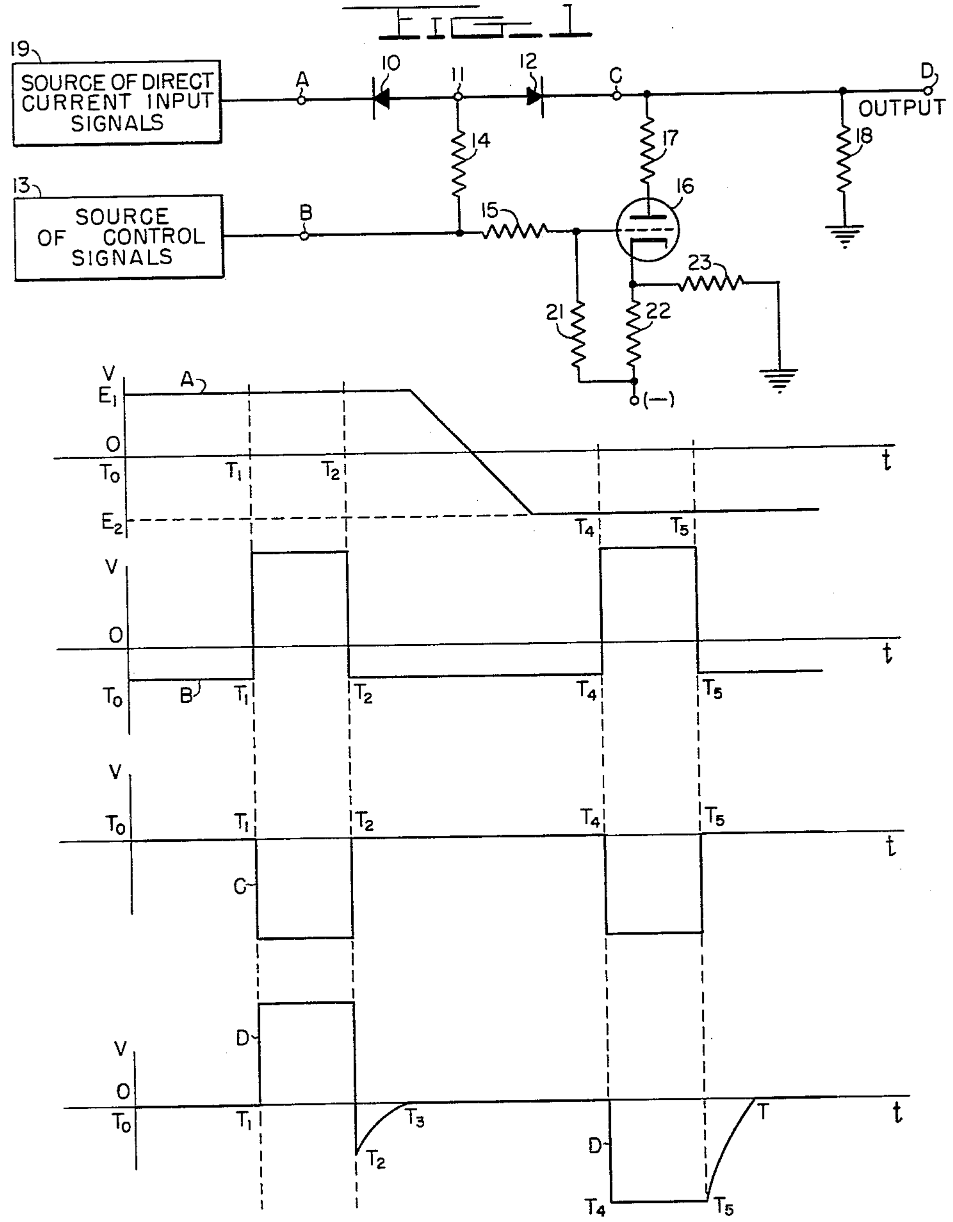

The invention described herein may be manufactured and used by or for the Government of the United States of America for governmental purposes without the payment of any royalties thereon or therefor.

This invention relates in general to an electrical switching circuit and in particular to a switching circuit conditioned by a direct current signal and operated by a pulse waveform in predetermined time intervals.

This application is a division of Serial No. 669,687, "Switching Circuit," applicant Frederick R. Fluhr, filed July 2, 1957, now Patent No. 2,959,690, issued November 8, 1960.

In the prior art, switching circuits employed electron tubes that were conditioned by a first signal and operated by a second signal. Since these circuits employed electron tubes, they required a large number of components, were comparatively unreliable, and could be conditioned by direct current signals only with great difficulty. The switching circuits in the prior art that employed silicon junction diodes utilized the diodes in bridge circuits. These circuits required four diodes for each switching circuit and raised the difficult problem of properly matching the selected diodes. In addition, whether electron tubes or diodes were used, the switching circuits in the prior art had large current and voltage transients in their output signal.

Accordingly, it is an object of the present invention to provide a reliable electrical switching circuit employing a minimum number of components.

Another object of the present invention is to provide a switching circuit having minimum circuit transients.

Other objects and many of the attendant advantages of this invention will be readily apparent as the same becomes better understood by reference to the following detailed description when considered in connection with the accompanying drawings wherein:

FIG. 1 discloses an embodiment of the present invention, and

FIG. 2 represents waveforms at selected points in the embodiment shown in FIG. 1.

In accordance with the present invention, an electrical switching circuit is provided in which a first unilateral impedance device and a second unilateral impedance device are connected in series. A direct current input signal is applied to the first unilateral impedance device to condition the electrical switching circuit for operation and a first control signal and a second control signal are applied to the first unilateral impedance device and the second unilateral impedance device, respectively, to operate the electrical switching circuit in predetermined time intervals. When operated, the switching circuit provides an output signal in dependency on the direct current input signal.

Referring to FIG. 1, unilateral impedance device 10 is connected in the high conduction direction between terminals 11 and A and unilateral impedance device 12 is connected in the high conduction direction between terminals 11 and C. Thus, unilateral impedance devices 10 and 12 are connected front to front. It is understood that the unilateral impedance devices are connected in series and in inverse polarity. A source of control signals 13 is connected through terminal B and resistor 14 to terminal 11 and through resistor 15 to the control grid of electron tube 16. The anode of electron tube 16 is connected through resistor 17 to unilateral impedance device 12. Unilateral impedance device 12 and terminal D are connected to ground through resistor 18. And, a source of direct current input signals 19 is connected to terminal A.

In the arrangement shown in FIG. 1, unilateral impedance devices 10 and 12 may be any high quality silicon diodes so long as the diodes have extremely high back impedance and high forward conduction. For example, the unilateral impedance devices may be conventional diodes 1N458 or 1N458A. Resistor 18 should have a very high resistance, while the source of direct current input signals 19 should have a comparatively low impedance in respective comparison with the conduction impedance of unilateral impedance devices 10 and 12. Thus, if when 5 milliamperes flows through unilateral impedance devices 10 and 12, the sum of the high conduction impedances of the unilateral impedance devices is less than 500 ohms, the source of direct current input signals 19 should have a source impedance of less than 100 ohms and resistor 18 should have a resistance of approximately 100,000 ohms. Source of control signals 13 may apply a control signal to terminal B that has any period that is consistent with the pulse width of the control signal. The magnitude of the control signal applied by source of control signals 13 to terminal 11 in a predetermined polarity must be greater than the level of the input signal applied to terminal A in the predetermined polarity of the control signal. Electron tube 16 may be any conventional triode such as a 6C4; and preferably, resistors 15, 21, 22 and 23 are selected to give electron tube 16 an operating condition such that the anode of electron tube 16 will have a voltage whose value is substantially —V when the control signal provided by source of control signals 13 has a value of +V.

Referring to FIG. 2, waveforms A and B are applied by source of direct current input signals 19 and source of control signals 13 to terminals A and B, respectively, in FIG. 1. During time interval $T_0$–$T_1$, the negative voltage of waveform B is applied to terminal 11 and to the control grid of electron tube 16, thereby cutting off the electron tube and raising the impedance of unilateral impedance devices 10 and 12. (Unilateral impedance devices 10 and 12 are substantially open circuit.) At time $T_1$ the leading edge of the positive voltage of waveform B is applied to terminal 11 and to the control grid of electron tube 16. The electron tube conducts and applies the leading edge of the negative voltage of waveform C to terminal C. Thus, the impedances of unilateral impedance devices 10 and 12 are lowered; and since the circuit between terminals A and D is closed, the leading edge of waveform D appears across resistor 18. At time $T_2$ when the trailing edge of waveform B is applied to terminal B and the trailing edge of waveform C is applied to terminal C, raising the impedances of unilateral impedance devices 10 and 12, the trailing edge of waveform D appears across resistor 18. The portion of waveform C between $T_2$ and $T_3$ is dependent on the circuit transients which are attributed primarily to the holes stored in unilateral impedance devices 10 and 12 and the stray capacitance of the circuit wiring. In a similar manner, during the time interval $T_4$–$T_5$, the impedance of unilateral impedance devices 10 and 12 are lowered by the control signal applied to terminal B and waveform C applied to terminal C in FIG. 1 and the portion of waveform D shown in this time interval in FIG. 2 appears across resistor 18. The portion of waveform D in time interval $T_5$–$T_6$ is dependent on the circuit transients.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. In an electrical switching device producing an output signal dependent on the polarity of the direct current input, a first unilateral impedance device, a second unilateral impedance device, means connecting said first unilateral impedance device and said second unilateral impedance device in series and in inverse polarity, a variable impedance device having a first element, a second element, and a control element, means for applying the same control signal of the same polarity between said first and second unilateral impedance devices and to said control element, an input signal, means for applying said input signal to said first unilateral impedance device, an output circuit, and means connecting said output circuit to said second unilateral impedance device, means connecting said second element between said second unilateral impedance device and output circuit.

2. In an electrical switching device, a first terminal, a second terminal, and a third terminal, a first unilateral impedance device, a second unilateral impedance device, means connecting said first unilateral impedance device between said first terminal and said second terminal, means connecting said second unilateral impedance device between said second terminal and said third terminal so that the first unilateral impedance device and the second unilateral impedance device are connected in series and in inverse polarity, a variable impedance device having a first element, a second element, and a control element, means for applying the same control signal of the same polarity to said control element and to said second terminal, means connecting said second element to said third terminal, means for applying an input signal to said first terminal, an output circuit, and means for connecting said output circuit to said third terminal.

3. In an electrical switching device, a first terminal, a second terminal and a third terminal, a first unilateral impedance device, a second unilateral impedance device, means connecting said first unilateral impedance device between said first terminal and said second terminal, means connecting said second unilateral impedance device between said second terminal and said third terminal so that the first unilateral impedance device and the second unilateral impedance device are connected in series and in inverse polarity, a control circuit including a variable impedance device having a first element, a second element and a control element for providing a first control signal of predetermined magnitude and predetermined polarity, means connecting said second element to said third terminal, means for applying a second control signal to said second terminal, said second control signal being substantially equal in magnitude and opposite in polarity to said first control signal, means for applying an input signal to said first terminal, said input signal having a level that is less than said predetermined magnitude and in a polarity that is opposite to said predetermined polarity, an output circuit, and means for connecting the output circuit to said third terminal.

References Cited in the file of this patent

UNITED STATES PATENTS

| | | |
|---|---|---|
| 2,258,732 | Blumlein et al. | Oct. 14, 1941 |
| 2,691,745 | Rockafellow | Oct. 12, 1954 |
| 2,773,250 | Aigrain et al. | Dec. 4, 1956 |